United States Patent [19]

Prescott

[11] Patent Number: 4,964,692
[45] Date of Patent: Oct. 23, 1990

[54] FIBER BUNDLE ILLUMINATION SYSTEM

[75] Inventor: Rochelle Prescott, Arlington, Mass.

[73] Assignee: Smith & Nephew Dyonics, Inc., Andover, Mass.

[21] Appl. No.: 763,401

[22] Filed: Aug. 7, 1985

Related U.S. Application Data

[63] Continuation of Ser. No. 400,395, Jul. 21, 1982, abandoned, which is a continuation-in-part of Ser. No. 188,761, Sep. 19, 1980, abandoned.

[51] Int. Cl.$^5$ .............................................. G02B 6/04
[52] U.S. Cl. ............................. 350/96.24; 350/96.25; 350/96.26; 362/32
[58] Field of Search .............. 350/96.15, 96.16, 96.18, 350/96.24, 523; 353/102, 74, 78, 26 R; 362/32

[56] References Cited

U.S. PATENT DOCUMENTS

| | | | |
|---|---|---|---|
| 2,589,569 | 3/1952 | Peter et al. | 177/329 |
| 3,157,089 | 11/1964 | Menefee | 88/58 |
| 3,417,745 | 12/1968 | Sheldon | 128/6 |
| 3,421,808 | 1/1969 | Gottlieb | 350/17 |
| 3,455,625 | 7/1969 | Brumley et al. | 350/96.21 |
| 3,596,083 | 7/1971 | Lovering | 240/41 R |
| 3,600,568 | 8/1971 | Weyrauch | 353/102 |
| 3,669,524 | 6/1972 | Shio | 350/87 |
| 3,859,536 | 1/1975 | Thiel | 250/552 |
| 3,874,780 | 4/1975 | Love | 350/96.16 |
| 3,902,786 | 9/1975 | Brown | 350/96.16 |
| 3,981,590 | 9/1976 | Perkins | 356/178 |
| 3,997,240 | 12/1976 | Kebabian | 350/169 |
| 4,017,150 | 4/1977 | Imai | 350/231 |
| 4,027,153 | 5/1977 | Käch | 250/199 |
| 4,092,059 | 5/1978 | Hawkes et al. | 350/96.16 |
| 4,105,332 | 9/1978 | Hohne et al. | 356/5 |
| 4,184,739 | 1/1980 | d'Auria et al. | 350/96.15 |
| 4,251,128 | 2/1981 | Feinbloom | 350/91 |
| 4,355,867 | 10/1982 | Stachiw | 350/319 |
| 4,360,372 | 11/1982 | Maciejko | 65/4.21 |
| 4,371,258 | 2/1983 | Mast | 355/37 |
| 4,403,273 | 9/1983 | Nishioka | 362/32 |
| 4,415,240 | 11/1983 | Nishioka et al. | 350/442 |
| 4,496,211 | 1/1985 | Daniel | 350/96.20 |
| 4,500,167 | 2/1985 | Mori | 350/96.32 |
| 4,505,555 | 3/1985 | Piller et al. | 350/527 |

FOREIGN PATENT DOCUMENTS

| | | |
|---|---|---|
| 1913711 | 10/1969 | Fed. Rep. of Germany . |
| 2205996 | 8/1973 | Fed. Rep. of Germany . |
| 2544519 | 4/1976 | Fed. Rep. of Germany . |
| 55-41466 | 3/1980 | Japan ................................. 350/96.15 |

OTHER PUBLICATIONS

Hocker, *Optics Letters,* vol. 1, No. 4, Oct. 1977; "Unidirectional Star Coupler for Single-Fiber Distribution Systems", pp. 124–125.

Oppenheimer et al., *Microscope,* 1976, "An Obvious Illuminator for Dispersion Staining", pp. 291–294.

*Primary Examiner*—Frank Gonzalez
*Attorney, Agent, or Firm*—Fish & Richardson

[57] ABSTRACT

An improved system for projecting uniform illumination for observation, combining a flexible fiber light guide with a clad cane element which mixes light rays from the fiber bundle to provide uniform brightness across the output face of the clad cane element in a system which lends itself to compactness in design. The fiber light guide comprises a flexible bundle or small, discrete clad fibers, and the bundle receives light from a primary light source at one end. The clad fibers are joined together at the other end to define, along with the spaces therebetween, an output face which forms a source of light of non-uniform brightness. This non-uniform light is received by the clad can element, which has a transparent, homogeneous core with a high refractive index and a thin clad having a low refractive index surrounding the core. The clad cane element is of sufficient size and disposition so that all the light from the bundle is received by the clad cane element, and is of sufficient length so that the light rays from the bundle are internally mixed so that the light is uniform at an output face of the clad cane element. A downstream lens is located at a distance at least equal to its focal length from the output face of the clad cane element, and the lens receives the uniform light therefrom and focuses the image of the output face of the clad cane element on the object plane to be illuminated, in a sharply defined beam with essentially total conservation of brightness.

17 Claims, 3 Drawing Sheets

FIBER BUNDLE ILLUMINATION SYSTEM

CROSS-REFERENCE

This application is a continuation of application Ser. No. 400,395, filed July 21, 1982 which is a continuation-in-part of U.S. patent application Ser. No. 188,761, filed Sept. 19, 1980 (both abandoned).

FIELD OF THE INVENTION

This invention relates to an illumination system for visually observing a selected object plane, particularly for use with microscopes, e.g., medical operations microscopes, and other viewing systems.

BACKGROUND OF THE INVENTION

There are a number of systems for illuminating areas or objects for visual observation. The simplest system, i.e., critical illumination in microscopy, or searchlight optics on a larger scale, merely produces an image of its primary light source on the target area or object plane. If the primary light source does not have a uniform brightness, neither does its image, and consequently, the illumination is non-uniform, which is undesirable for many applications.

In order to obtain both well-defined and uniform illumination, two more complex systems have been used. One of these is a Kohler illumination system in which a non-uniform light source is imaged on a second lens by a first lensed of an image of the first lens formed of the second lens on the object plane. When used with a microscope, however, the Kohler system has a long fixed length, e.g., of about 12 cm. Due to its length, the Kohler system provides an obstruction to movements of the surgeon using the microscope in performing eye and other surgery.

The other system is a projection condenser system, which is similar to the Kohler illumination system and used with larger devices. As with the Kohler system, the distance between the primary light source and the object plane is fixed and is not practical, e.g., for medical microscopes.

SUMMARY OF THE INVENTION

I have discovered an improved system for projecting uniform illumination for visual observation which combines with a flexible fiber light guide a clad cane element which, mixes light rays to provide uniform brightness across the output face of the clad cane element. The fiber light guide is of conventional construction, e.g., comprising a flexible, elongated bundle of relatively small, discrete clad fibers, the bundle having an input end adapted to receive light from a primary light source and an output end from which the light is transmitted. The fibers of the bundle are independent from one another along their length to permit flexing of the bundle as a whole to desired configurations, and the output end portions of the fibers are joined together into an array to cooperatively define an output face of the fiber bundle. The ends of the individual clad fibers are adapted to transmit light through the output face, but, as has long been known, the regions between the fiber ends do not transmit light so that the light leaving the output face is of a non-uniform brightness across this face on the micro scale. Typically, the brightness across the output face is also nonuniform on the macroscale. The clad cane element has an input face which corresponds to the output face of the fiber bundle in size and position, and the clad cane element is adapted to direct light from its output face through the remaining part of the illumination system. The clad cane element has a transparent, homogeneous core of a relatively high refractive index sized to receive substantially all the light transmitted through the output face of the flexible fiber bundle. The exterior of the core is surrounded with a relatively thin clad layer of a substance having a relatively low refractive index, whereby light as it proceeds through the core is subject to total reflection from the clad. The length of the cane element is predetermined (e.g., of the order of the diameter of the bundle or greater) such that the light rays entering the core are and mixed to provide uniform brightness across the output face of the clad cane element. A lens is located downstream from the output face of the cane element at a distance at least equal to the focal length of the lens. The lens is disposed to receive the projected light of uniform brightness from the output face of the cane element and adapted to focus the image of the output face to provide a well-defined, uniform projected beam for illumination of an object to be viewed with essentially total conservation of brightness.

In one aspect of the invention, there is a hyperhemispherical lens attached to the output face of the cane element to reduce the angle of the uniform light directed to the downstream lens. In another aspect, the clad cane element is tapered to accomplish the same function.

In another aspect, the downstream lens focuses the light at infinity. In another aspect, the system is a homogeneous illuminator and the downstream lens is a doublet lens which is movable along its central axis so as to adjust the focal plane of the uniform light therefrom.

The system may be connected to an operations microscope in a compact, easily used arrangement, to direct a well-defined uniform beam of light on an object plane to be observed. It may also be used with a compound microscope having an adjustable field iris disposed adjacent to the output face of the cane, and an adjustable aperture iris disposed between the field iris and the downstream lens. The field iris is increased in size and the aperture iris reduced in size as the microscope magnification decreases.

In a further aspect, the system comprises a microfilm projection system in which the expanded focused beam from the downstream lens is directed onto a projection screen, and the film to be displayed thereon is placed adjacent to the output face of the clad cane element.

DRAWINGS

I now turn to a description of preferred embodiments of the invention, after first briefly describing the drawings.

DESCRIPTION OF THE PRESENTLY PREFERRED EMBODIMENT

Operations Microscope

Figure 1:
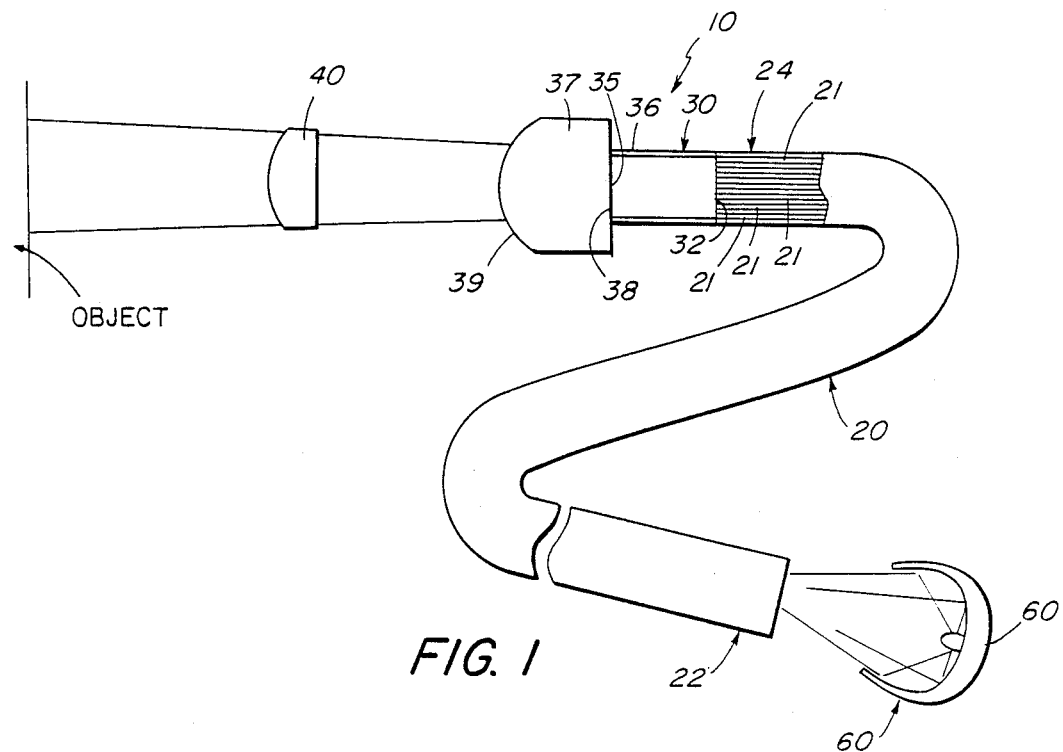
FIG. 1 is a diagram of this invention with a portion of a light guide broken away, and also showing an object to be illuminated.

As shown in FIG. 1, an illumination system 10 of this invention generally comprises a flexible light guide bundle 20 made up of small discrete optical fibers 21, a clad cane (clad rod) element 30 and a downstream lens 40. In addition, the illumination system 10 uses a primary light source 60, and may use a second lens 37, the function of which will be explained below.

Figure 2:
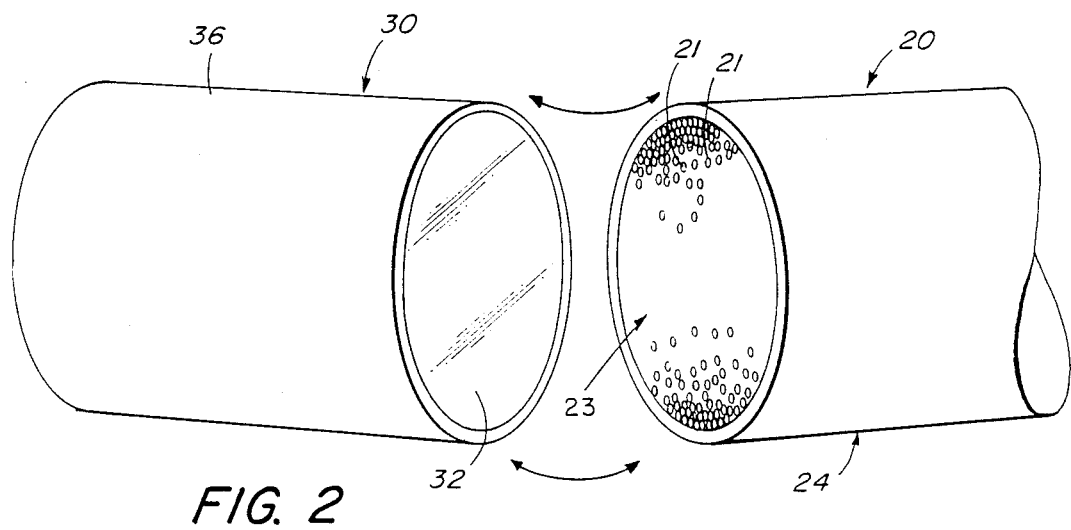
FIG. 2 is an enlarged view of the output end of the light guide and the clad cane element, shown swung apart.
Figure 3:
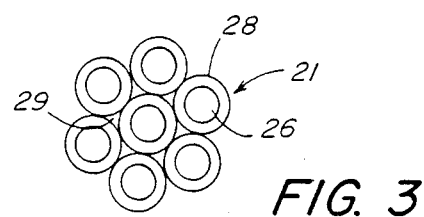
FIG. 3 is an enlarged cross-sectional view of a portion of the fiber bundle of this invention.

The flexible fiber bundle 20 has an input end 22 and an output end 24. As best shown in FIG. 2, (which shows the clad cane element 30 and the bundle 20 swung apart for purposes of illustrating the construction; not as they would be in operation), the flexible bundle 20 is made up of several thousand individual optical light guide fibers 21. Each fiber 21 is about 0.056 mm in diameter, and the diameter of the bundle 20 is about 8 mm. As indicated in FIG. 3, each fiber 21 comprises a transparent central core 26 surrounded by a clad 28 of lower index of refraction of about 2.5 microns thick (relative thickness shown exaggerated in the figure). The clad reflects light, which would otherwise leave the fiber core, back into the core. The core 26 is Schott F2 glass, and the clad 28 is Owens-Illinois EN-1 glass. The individual fibers 21 are packed together in a hexagonal arrangement with triangular spaces 29 between each three. These spaces 29, along with the clad 28, do not carry any light. The ends of the fibers 21 are joined together at the output end 24 of the bundle 20 to form an output face 23. The output face 28, however, also includes the spaces 29 between the fibers 21 and the fiber clads 28. Therefore, the light over the output face 23 of the bundle 20 is non-uniform in intensity and brightness.

Another source of nonuniform brightness arises because of nonuniform illumination of the fiber bundle input end 22 by the light source 60.

The output face 23 of the fiber bundle 20 contacts input face 23 of the clad cane element 30. The clad cane element 30 is cylindrical and has a core 34 which is homogeneous, transparent and in the preferred embodiment, comprising a single piece. The core 34 is made of Schott F2 glass and has a diameter of 8 mm and a length of 10 mm. The core 34 has a relatively high refractive index, and light passes through it essentially without loss. Importantly, the core 34 contains no internal element which might become apparent if the core's output face is imaged. The core 34 is surrounded by a thin clad 36 of a relatively low refractive index, such as Owens-Illinois EN-1 glass. The clad 36 is about 0.3 mm thick. Clad cane elements such as this are inexpensive and available from American Optical Corporation.

Figure 4:
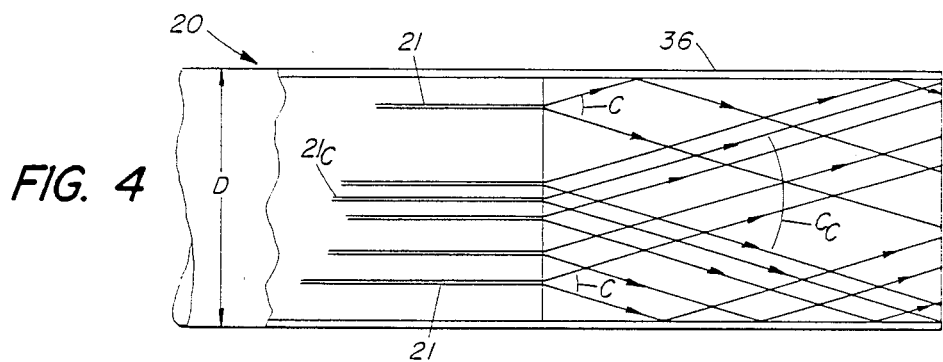
FIG. 4 is an enlarged cross-sectional view of the clad cane element and output end of the light guide, also showing the paths of some light rays.

As is shown in FIG. 4, rays of light tend to leave the fibers 21 at the end of the bundle 20 at an expanding angle so that a cone of light exits from each fiber 21 (only a few shown for illustrative purposes). This light enters the clad cane core 34, and proceeds through the core 34 to an output face 35 of the clad cane element 30 at its opposite end virtually without loss. As the light proceeds through the cane element, the expanding light canes, which have different intensities from individual fibers intersect and light striking the clad 36 is reflected internally back into the core 34, so that by the time the light reaches the output face 35, the light beams are so mixed together and homogenized that the light can be of uniform intensity over the entire output face 35, as diagrammatically illustrated in FIG. 4.

The homogenizing function of the clad cane element 30 is increased with increase in its length.

A short length, e.g. $\frac{1}{8}$ of the diameter D of the fiber bundle, can provide correction of uniformity on the micro scale. This length can generally provide sufficient mixing of rays from adjacent fibers 21 to avoid nonuniformities attributable to non-light transmitting regions 28,29 between the fiber cores. At the same time a sharply defined beam of light can be achieved by focusing the output end of the core element with the downstream optical system.

In conventional fiber bundles used for illumination there is an additional problem of nonuniformity of light also on the macro scale. That, too, can be dealt with by proper choice of the length of cane element 20. This problem can be due to nonuniformity of the illumination of the input end of the fiber bundle, and imperfect scattering or "randomization" of the position in the respective faces of the bundle, of the individual fiber output ends relative to their input ends.

In general, the length of the cane element for such conventional illumination bundles is sufficient to provide a sensibly uniform brightness at the output face if it is such that a limiting ray from each fiber reaches a point on the reflecting surface of the clad cane element, as shown in FIG. 4. Note that limiting light cone $C_c$ of central fiber $21_c$ just reaches the reflective surface of clad 36 at the downstream end of the clad element 30, and that rays of the cones of outer fibers reach the reflective surface increasingly sooner with increasing radius from the center.

Again, with this longer length cane element, by focusing the output end of the element with the downstream system, a sharply defined beam of light can be achieved, with essentially total conservation of brightness.

In cases of still greater nonuniformity of illumination of the bundle output end, still greater length of the cane element can improve the uniformity of illumination of the system to any desired value, still obtaining a sharply defined beam with conservation of brightness.

As shown in FIG. 1, the output face 35 of the clad cane element 30 contacts a plane surface 38 of lens 37. To avoid light loss, surface 38 is cemented to output face 35. Lens 37 is a hyperhemispherical lens of Schott K5 glass having a 25 mm diameter and thickness. Lens 37 also has a convex surface 39 opposite plane surface 38. Lens 37 functions only to narrow the light that exits from the clad cane element 30.

The downstream lens 40, which is rectangular in the preferred embodiment in order to fit into the body of the microscope, is positioned away from the lens 37. Downstream lens 40 is large enough to capture as much of the light as possible from lens 37 (if a circular lens could be used all the light could be captured), and lens 40 is positioned at a distance downstream from the output face 35 of the clad cane element 30 so that the output face 35 is at the effective focal plane of the combination of the hyperhemispherical lens 37 and the downstream lens 40. This effective focal length is 30 mm. The actual focal length of lens 40 is 74 mm, and it is 52.5 mm from the output face 35 of the clad cane element 30. Of course, a single lens could be used (the downstream one corresponding to lens 40), and in that case, the clad cane element output face should be placed at the actual focal plane of the lens. In the single lens case, however, the downstream lens would have to be large enough to capture all of the light from the clad cane element.

Figure 5:
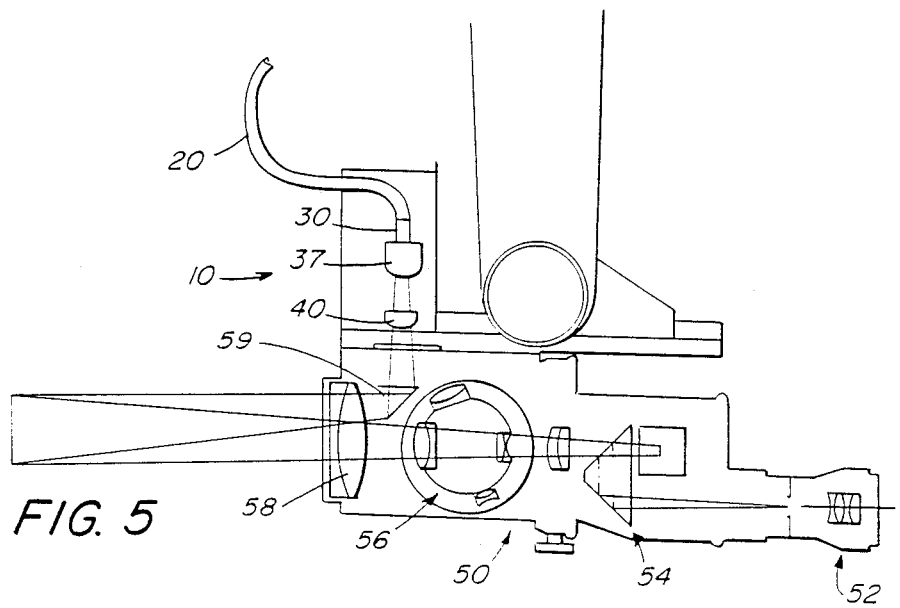
FIG. 5 is a diagrammatic view of the illumination system of this invention mounted in a microscope.

A preferred use for the illumination system 10 of this invention is as part of an operation microscope 50, as shown in FIG. 5. The microscope 50 (a modified Zeiss binocular surgical microscope is shown) basically comprises an eyepiece assembly 52, a prismatic binocular assembly 54, a magnification changer 56 and an objective lens 58. Normally, this type of microscope also carries its own primary light source as well, and that source requires a substantial amount of space. Also, because of the heat generated by the light source, the source must be positioned away from the remainder of the instrument. As such, the microscope is somewhat bulky and difficult to use in some applications.

Here, the illumination system 10 of this invention replaces the primary light source (and the associated bulky part in which it is mounted). As shown, a mirror 59, positioned at a 45° angle above a portion of the microscope's objective lens 58, directs the uniform light from the lens 40 through the objective lens 58. The overall length of the system from the input face of the clad cane element 30 to the downstream lens 40 is only about 7 cm. When the illumination system 10 is connected to the microscope 50 as shown, a primary light source (not shown here) is a high intensity, a tungsten-halogen lamp with a quartz envelope, which is positioned to direct its light into the input end 22 of the fiber bundle 20 (as shown in FIG. 1). In order to direct as much of the light as possible into the fiber bundle, the source 60 is placed at the focal point of an ellipsoidal reflective surface 62 which directs the light into input end 22 of the fiber bundle 20. As the bundle 20 is flexible because it is made up of a large number of separate and flexible fibers 21 and as there is little light loss over its length, the primary light source can be positioned remotely (about 2 meters maximum preferably), wherever desired with respect to the microscope 50.

As shown in FIG. 5, the light from the downstream lens 40 overlaps the viewing path to the binocular assembly 52 so that the uniform light from the illumination system 10 is nearly coaxial with the direction of view, and a well-defined light area with a minimum of light outside the area is projected onto the object plane. The objective lens 58 of the microscope thus provides the dual effect of having its focal plane determine the object plane of the microscope as well as defining the image of the output face 38 of the clad cane element 30.

Operation

In the presently preferred embodiment, the primary light source 60 is turned on, and the reflective surface 62 directs the light from the source 60 into the input end 22 of the fiber bundle 20.

The light then passes through the cores 26 of the fibers 21 to the output end 24 of the bundle 20. The clads 28 reflect back into their respective cores 26 any light which would otherwise pass through the sides of the cores, and therefore, almost all the light which enters the fibers 21 at the input end 22 of the bundle 20 exits from the fibers 21 at the output face 23. Of course, the length of the bundle will vary from application to application, and as the bundle can be twisted into almost any shape without affecting its light transmission abilities, the heat-generating light source 60 may be positioned at a distance from the microscope 50.

The output face 23 of the bundle acts as a secondary light source. This secondary light source will be non-uniform, as previously explained. The non-uniform light then passes into the clad cane element 30 through its input face 32. As the light exits from each individual fiber 21 of the bundle 20 in a cone-shaped beam, the various rays of light overlap, and some of them reflect from the clad 36 of the clad cane element 30. The individual boundaries of the fibers cores 26 and the dark areas 29 between the fibers disappear, and the light becomes of uniform intensity across the entire output face 35.

This uniform light from the clad cane element 30 then enters the hyperhemispherical lens 37. Lens 37 narrows the cone of light to about a 16° half angle. This reduced numerical aperture permits all of the light to be captured by the downstream lens 40 (if the downstream line is circular), which capture could otherwise only be accomplished with a large lens. The hyperhemispherical lens 37, however, may be omitted if the downstream lens is of sufficient numerical aperture to capture all the light from the clad cane element.

The optical distance between the lens 40 and output face 35 of the clad cane element 30 is equal to the focal length of the lens 40, the lens 40 projects the image of the output face 35, which image is uniformly bright, as previously explained.

The beam of light from the rectangular lens 40 is directed by the mirror 59 through the microscope lens 58 onto a plane to be illuminated. The beam is essentially coaxial with the light to the viewing assembly.

Other Embodiments

Figure 6:
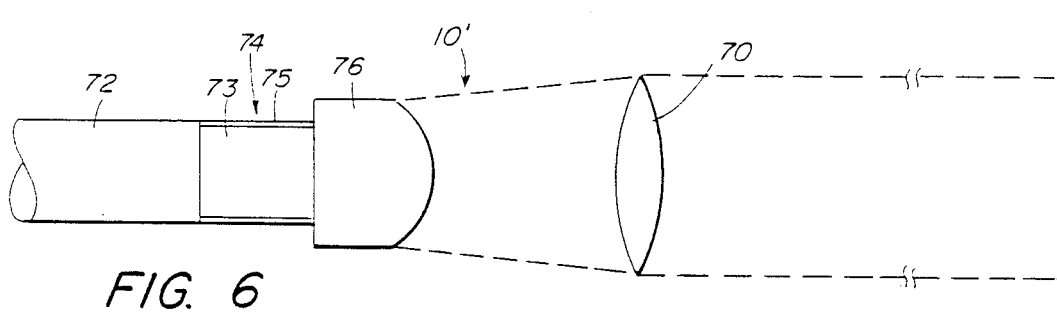
FIG. 6 is a view of another illumination system of this invention.

As shown in FIG. 6, a circular downstream lens 70 (replacing lens 40) may be used in the illumination system 10. Here, a fiber bundle 72 is attached to a clad cane element 74 having a core 73 and a surrounding clad 75. The clad cane element 74 is attached to a hyperhemispherical lens 76, as in the previous embodiment. The circular lens 70 is positioned at a distance downstream so that an output face 77 of the clad cane element 74 is at the effective focal plane of the lenses 70, 76, and an expanded, collimated beam from the lens 70 is focused at infinity (i.e., "infinity" being used in the normal optical sense where a greater distance would not make any difference in imaging). Therefore, any object placed in the beam is illuminated by a focused beam of light.

Figure 7:
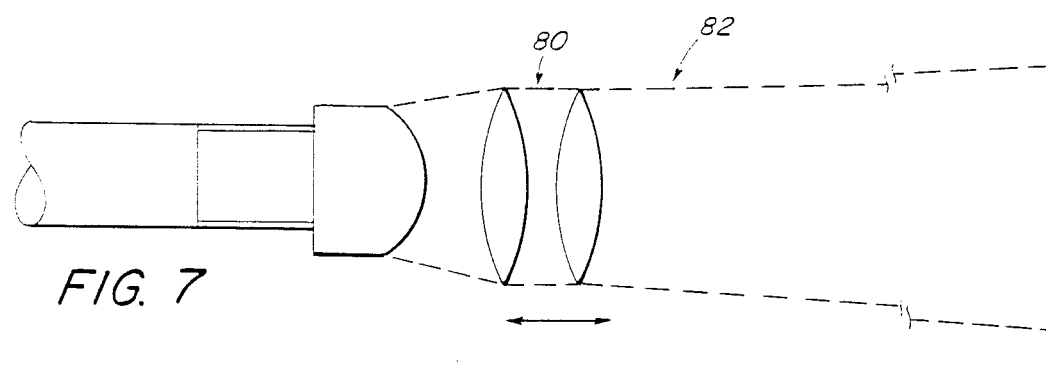
FIG. 7 is a view of the homogeneous illuminator embodiment of this invention.

In another embodiment, as shown in FIG. 7, a doublet lens 80 may be used as the downstream lens in the illumination system. In this case, the system forms a homogeneous illuminator 82, which is very useful in illuminating deep orifices, i.e., deep surgical wounds. The doublet lens 80 is made of Bausch and Lomb opthalmic crown 523580 and is about 40 mm in diameter. The lens 80 is movable along the central axis of the light beam, but the output face of the homogenizer is optically always at or farther than the effective focal plane of the doublet lens 80 and the hyperhemispherical lens. Movement of the lens 80 allows the expanded beam to be focused on any downstream object plane so that the light may be focused, for example, at any desired depth in the wound.

Figure 8:
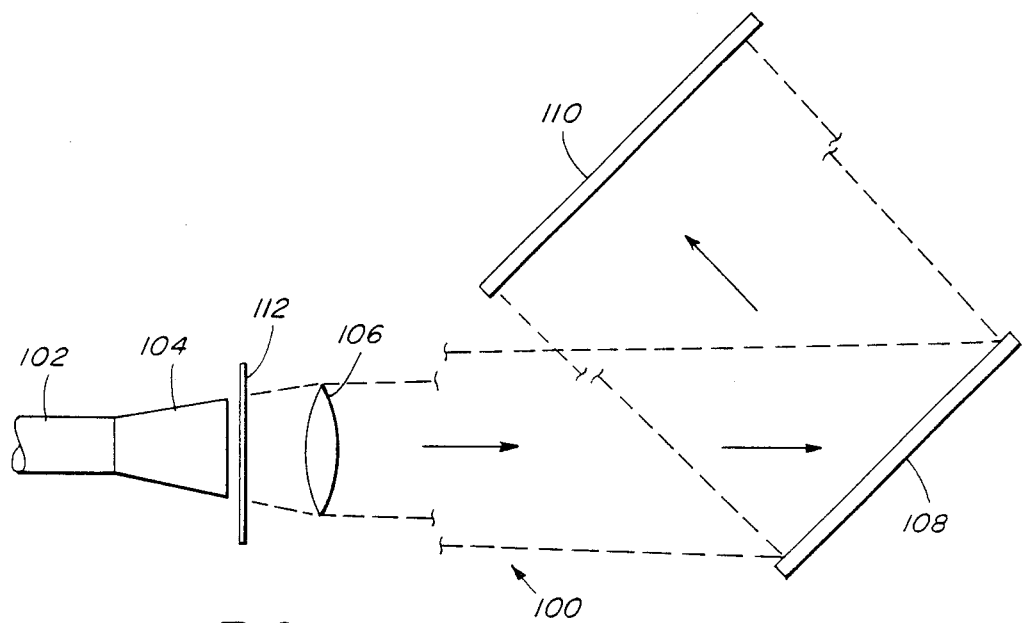
FIG. 8 is a view of a microfilm projection system of this invention.

In another embodiment, a microfilm projection system 100 is shown in FIG. 8. There, the output end of a fiber bundle 102 is connected to a tapered homogenizer 104. A downstream lens 106 receives and focuses the expanded uniform light from the homogenizer 104, which light is then reflected from a mirror 108 onto a back projection screen 110. In operation, the system 100 provides uniform backlighting for a transparency (e.g., microfilm). The microfilm 112 to be projected is placed adjacent to the output face of the homogenizer 104. The lens, which is placed a distance downstream from the film greater than its focal length, then projects the image of the film through the mirror to the screen. Because of the length of the fiber bundle, the heat-generating light source is positioned away from the film to be displayed. The taper of the homogenizer 104 reduces the numerical aperture or the angle of the light leaving it, and this reduces the size of the downstream lens needed to capture all the light. The tapered homogenizer may also be substituted for the cylindrical homogenizer and attached hyperhemispherical lens of the preferred embodiment.

Figure 9:
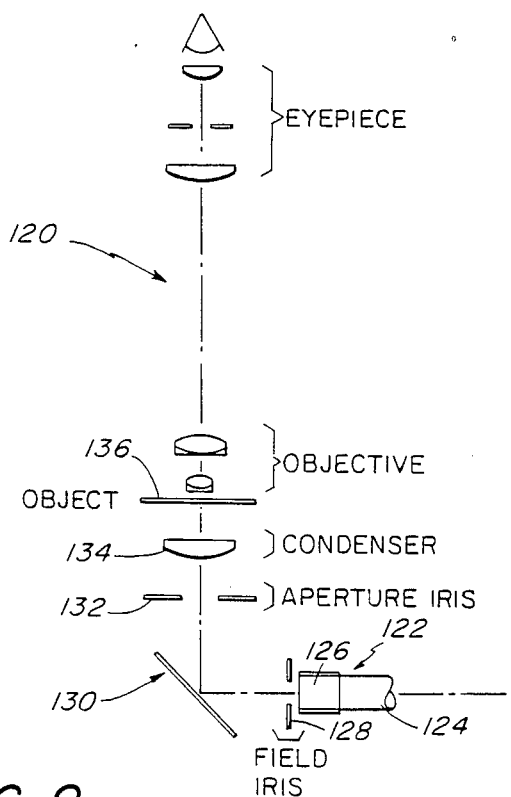
FIG. 9 is a diagram of a compound microscope using this invention.

A compound microscope embodiment is shown in FIG. 9. The illumination system 122 for a compound microscope 120 has a fiber bundle 124 with attached homogenizer 126. An adjustable field iris 128 is disposed adjacent to the output face of the homogenizer. The microscope 120 has a mirror 130 angled to direct light from the homogenizer 126 through an aperture iris 132 located below a downstream lens 134 and the object plane 136. In operation, the cone of light falling on the object plane can be adjusted with the magnifying power of the microscope. A low magnification, there is a large field of view of the object plane, and a narrow cone angle of light is desirable. This is accomplished by decreasing the size of the aperture iris 132 and increasing the size of the field iris 128. At high magnification, it is desirable to decrease the area illuminated without decreasing the brightness. This is accomplished by opening the aperture iris 132 and closing the field iris 128.

Other applications and variations will be apparent to those skilled in the art.

What is claimed is:

1. A system for projecting uniform illumination for visual observation, comprising:

a flexible, elongated light guide comprising a bundle or relatively small, discrete clad fibers, said bundle having an input end adapted to receive light from a primary light source, and an output end from which light is transmitted, said fibers of said bundle along their length being independent from one another to permit flexing, output end portions of said fibers being joined together into an array to cooperatively define an output face of said fiber bundle, said system causing the ends of the individual clad fibers to transmit light through said output face with non-uniform brightness across said face, a clad cane element having an input face and an output face, said cane element input face corresponding to said output face of said fiber bundle in size and positioned to receive substantially all light transmitted through said output face of said fiber bundle, said output face of said cane element adapted to direct light through the remaining part of said illumination system, said cane element comprising a transparent homogeneous core, sized to receive substantially all light transmitted through said output face of said fiber bundle, the substance of said core having a relatively high refractive index, the exterior of said core being surrounded with a relatively thin clad layer of substance having a relatively low refractive index whereby light proceeding through said core is subject to internal reflection from the clad, said cane element having a predetermined length enabling light rays entering said core to be internally mixed to provide uniform brightness across said output face of said clad cane element, a first lens means located downstream from said output face of said clad cane element at a distance therefrom at least equal to the effective focal length of said lens means, said first lens means receiving said light of uniform brightness projected from said output face of said cane element and focusing the image of said output face of said cane element to provide a projected beam for illumination of an object to be viewed.

2. The illumination system of claim 1 wherein there are non-light transmitting regions of the output face of said fiber bundle between light-transmitting cores of the fibers, the length of said clad cane element being selected to provide correction of non-uniformities on the micro-scale attributable to said non-light transmitting regions.

3. The illumination system of claim 1 in which fibers comprising said output face of said bundle are not uniformly illuminated and the length of said clad cane element being selected to provide correction of non-uniformities on the micro-scale attributable to said non-uniform illumination of said fibers.

4. The illumination system of claim 3 wherein the length of said clad cane element is cooperatively selected in relation to the diameter of said fiber bundle that a limiting ray from each fiber comprising said bundle reaches a point on the reflecting surface of the clad of said clad cane element.

5. The illumination system of claim 1 wherein said cane element has a length of the order of its diameter or greater.

6. The illumination system of claim 1 wherein a second lens means is directly attached to the output face of said clad cane element, said second lens means constructed to reduce the angle of the uniform light directed toward said first lens means downstream.

7. The illumination system of claim 6 wherein said second lens means attached to said clad cane element is hyperhemispherical.

8. The illumination system of claim 1 wherein said clad cane element is tapered so as to reduce the angle of the light exiting therefrom.

9. The illumination system of claim 1 wherein said first lens means focuses the light at infinity.

10. The illumination system of claim 1 wherein said system is connected to an operations microscope so as to direct a well defined, uniform beam of light on an object plane to be observed.

11. The illumination system of claim 1 wherein said system is a homogeneous illuminator for illuminating deep orifices, said first lens means of said illuminator being movable along its central axis to adjust the focal plane of the uniform light therefrom.

12. The illumination system of claim 1 wherein said system comprises a microfilm projection system including means for directing the expanded focused light from said downstream lens onto a projection screen, and means for placing the film to be displayed on said screen adjacent to the output face of said clad cane element so that the film is displayed on said screen.

13. The illumination system of claim 1 connected to a compound microscope having an adjustable field iris disposed adjacent to said output face of said cane element, and an adjustable aperture iris disposed between said field iris and said downstream lens, said iris being reduced in size as the microscope magnification decreases.

14. A system for projecting uniform illumination for visual observation, comprising:
- a flexible, elongated light guide,
  - said guide having an input end adapted to receive light from a primary light source, and an output end from which light is transmitted,
- a clad cane element having an input face and an output face,
  - said cane element input face corresponding to said output end and positioned to receive substantially all light transmitted through said output end of said guide, said cane element internally mixing the light rays from said guide to provide uniform brightness across said output face of said clad cane element,
- a first lens means attached to the output face of said clad cane element, said first lens means constructed to reduce the angle of the uniform light directed downstream,
- a second lens means located downstream from said output face of said clad cane element at a distance therefrom at last equal to the effective focal length of said second lens means,
- said lens means capturing said light of uniform brightness projected from said output face of said cane element and narrowed by said first lens means, and said second lens means focusing the image of said output face of said cane element to provide a projected beam of well-defined illumination for an object to be viewed.

15. A system for projecting uniform illumination for visual observation, comprising:
- a flexible, elongated light guide,
  - said guide having an input end adapted to receive light from a primary light source, and an output end from which light is transmitted,
- a clad cane element having an input face and an output face,
  - said cane element input face corresponding to said output end and positioned to receive substantially all light transmitted through said output end of said guide, said cane element internally mixing the light rays for said guide to provide uniform brightness across said output face of said clad cane element, said clad cane element being tapered to reduce the angle of the uniform light exiting therefrom and directed downstream,
- a lens means located downstream from said output face of said clad cane element at a distance therefrom at least equal to the effective focal length of said lens means,
  - said lens means disposed to capture said light of uniform brightness projected from said output face of said cane element and narrowed by said tapered cane element, and said lens means adapted to focus the image of said output face of said cane element to provide a projected beam of well-defined illumination for an object to be viewed.

16. A system for projecting uniform illumination for visual observation, comprising:
- a flexible, elongated light guide comprising a bundle of relatively small, discrete clad fibers,
- said bundle having an input end adapted to receive light from a primary light source, and an output end from which light is transmitted,
- output end portions of said fibers being joined together into an array to cooperatively define an output face of said fiber bundle,
- a clad coupling element having an input face and an output face,
- said coupling element input face corresponding to said output face of said fiber bundle in size and positioned to receive substantially all light transmitted through said output face of said fiber bundle, said output face of said coupling element adapted to direct light through the remaining part of said illumination system,
- said coupling element comprising a transparent homogeneous core of relatively high refractive index, surrounded with a relatively thin clad layer of relatively low refractive index,
- said coupling element having a predetermined length enabling light rays entering said core to be internally mixed to provide uniform brightness across said output face of said clad coupling element,
- lens means located downstream from said output face of said clad coupling element at a distance therefrom approximately equal to the effective focal length of said lens means.

17. The illumination system of claim 16 wherein said clad coupling element is tapered so as to reduce the angle of the light exiting therefrom.

* * * * *